(12) United States Patent
McLaren (10) Patent No.: US 11,175,902 B2
(45) Date of Patent: Nov. 16, 2021

(54) TESTING AN UPGRADE TO A MICROSERVICE IN A PRODUCTION ENVIRONMENT

(71) Applicant: Hewlett Packard Enterprise Development LP, Houston, TX (US)

(72) Inventor: Stuart McLaren, Galway (IE)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/812,634

(22) Filed: Mar. 9, 2020

(65) Prior Publication Data
US 2021/0279047 A1    Sep. 9, 2021

(51) Int. Cl.
G06F 8/65 (2018.01)
G06F 8/71 (2018.01)
G06F 11/36 (2006.01)

(52) U.S. Cl.
CPC .................. *G06F 8/65* (2013.01); *G06F 8/71* (2013.01); *G06F 11/3664* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 2018/0089011 | A1* | 3/2018 | Basiri | G06F 9/5077 |
| 2019/0155721 | A1* | 5/2019 | Reeve | G06F 11/3688 |
| 2020/0112487 | A1* | 4/2020 | Inamdar | H04L 41/082 |
| 2020/0412624 | A1* | 12/2020 | Brown | H04L 41/5022 |
| 2021/0073110 | A1* | 3/2021 | Vidal | G06N 20/00 |

OTHER PUBLICATIONS

Kargar, "Automation of Regression test in Microservice Architecture", 2018 4th International Conference on Web Research (ICWR) (Year: 2018).*

(Continued)

*Primary Examiner* — Hossain M Morshed
(74) *Attorney, Agent, or Firm* — Jaffery Watson Mendonsa & Hamilton (57) ABSTRACT

Embodiments described herein are generally directed to testing an upgrade to a microservice in a production environment. According to an example, a first domain specific language (DSL) program is loaded into a kernel that wraps a container of a production environment of a container orchestration system hosting a known working version of the microservice. Production interactions with the microservice are intercepted by the first DSL program and state information associated with the production interactions is persisted. A second DSL program is loaded into a kernel that wraps a container of the production environment hosting the upgraded microservice. The upgraded microservice is isolated from the production environment by using the persisted state information as a source of data for all requests issued by the upgraded microservice. Outputs of the upgraded microservice and the known working version of the microservice are compared by replaying the production interactions to the upgraded microservice.

20 Claims, 4 Drawing Sheets

(56) References Cited

OTHER PUBLICATIONS

Lumetta, "These are the most effective microservice testing strategies, according to the experts" 2018, Free Code Camp (Year: 2018).*
GitHub—twitter/diffy: Find potential bugs in your services with Diffy, https://github.com/twitter/diffy, downloaded Feb. 3, 2020, 4 pages.
Istio/What is Istio?, https://istio.io/docs/concepte/what-is-istio/, downloaded Feb. 3, 2020, 5 pages.
Sridharan, Cindy, Testing Microservices, the sane way, Dec. 30, 2017, https://medium.co,/@copyconstruct/testing-microservices-the-sane-way-9bb31d158c16, downloaded Feb. 3, 2020, 37 pages.
These are the most effective microservice testing strategies, according to the experts, Jun. 16, 2018, https://www.freecodecamp.org/news/these-are-the-most-effective-microservice-testing-strategies-according-to-the-experts-6fb584f2edde/. downloaded Feb. 3, 2020, 21 pages.
Anderson, E., et al., "Efficient Tracing and Performance Analysis for Large Distributed Systems", 2009 IEEE International Symposium on Modeling, Analysis & Simulation of Computer and Telecommunication Systems, Sep. 21, 2009, 10 pages.
Dupuy, A., et al. "NEST: A Network Simulation and Prototyping Testbed", In Communications of the ACM, Oct. 1990, 7 pages.
Fonseca, R., et al. "X-Trace: A pervasive network tracing framework", Proceedings of NSDI '07: 4th USENIX Symposium on Networked Systems Design & Implementation, 2007, 14 pages.
Geels, D., et al. "Replay debugging for distributed applications", Proceedings of 2006 USENIX Annual Technical Conference, Jun. 2006, 12 pages.
Google LLC. "Architecture Guide", gVisor. retrieved from internet archive <https://web.archive.org/web/20190706064748/https://gvisor.dev/docs/architecture_guide/>, Jul. 6, 2019, 2 pages.
Google LLC. "Overview & Platforms", gVisor, retrieved from internet archive <https://web.archive.org/web/20190705123441/https://gvisor.dev/docs/architecture_guide/overview/>, Jul. 5, 2019, 2 pages.
Hutchinson, N., et al.; "The X-Kernel: An Architecture for Implementing Network Protocols", IEEE Transactions on Software Engineering, Jan. 1991, 13 pages.
Reynolds, P., et al., "Pip: Detecting the Unexpected in Distributed Systems". Proceedings of NSDI '06: 3rd USENIX Symposium on Networked Systems Design & Implementation, 2006, 14 pages.
Urban, P., et al. "Neko: A Single Environment to Simulate and Prototype Distributed Algorithms", Journal of Information Science and Engineering, 2002, 17 pages.

* cited by examiner

TESTING AN UPGRADE TO A MICROSERVICE IN A PRODUCTION ENVIRONMENT

BACKGROUND

DevOps (a combination of software development (Dev) and information-technology (IT) operations (Ops)), microservices, and containerization and have changed the way applications are represented, developed, tested and deployed.

DevOps is a set of practices that automates the processes between software development and IT teams that seeks to facilitate building, testing, and releasing of software faster and more reliably. DevOps involves continuous planning, continuous testing, continuous integration, and other forms of continuous evolution of both the project and the software.

Microservice architecture takes advantage of the fact that applications are simpler to build and maintain when broken down into smaller pieces that work seamlessly together. As such, in contrast to the more traditional monolithic application architectures, the microservice architecture is an architectural style that structures an application as a collection of smaller, more specialized parts called services (or microservices), each of which communicate with one another across common interfaces (e.g., application programming interfaces (APIs) and representational state transfer (REST) interfaces, like Hypertext Transfer protocol (HTTP). Microservices are increasingly being used in the development world as developers work to create larger, more complex applications that are better developed and managed as a combination of smaller services that work cohesively together for more extensive, application-wide functionality.

The container eco-system is emerging as a prominent computing virtualization platform due in part to its native tenets of simplified manageability, scalability, and its natural fit with microservices and DevOps, A container is a standard unit of software that packages up code and its dependencies so the application runs quickly and reliably from one computing environment (e.g., a container orchestration platform provided by Amazon Web Services (AWS) (e.g., the Amazon Elastic Kubernetes Service (EKS)), Google (e.g., the Google Kubernetes Engine (GKE)), or Microsoft (e.g., the Azure Kubernetes Service (AKS)) to another. Containers offer a logical packaging mechanism in which applications can be abstracted from the environment in which they actually run. Instead of virtualizing the hardware stack as with the virtual machines approach, containers virtualize at the operating system level, with multiple containers running atop the OS kernel of a host system directly.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to testing an upgrade to a microservice in a production environment. In the following description, numerous specific details are set forth in order to provide a thorough understanding of example embodiments. It will be apparent, however, to one skilled in the art that embodiments described herein may be practiced without some of these specific details.

Microservices can help teams to both code and deploy more independently. However, testing a microservice based system can be challenging. There is no microservice test methodology that is universally accepted as a best practice. Adopted approaches can vary significantly. For example, depending upon the development team's preferences and/or the nature of the application, regression testing of an updated microservice may be performed pre-deployment in a test environment or in the production environment. Both approaches have various limitations and disadvantages.

Pre-deployment testing, such as unit, functional, integration, contract tests, and others, may be used to exercise microservice code paths using synthetic (i.e., not real production) input prior to deployment of the microservice under test within the production environment. These types of pre-deployment tests are limited, however, as they can only provide a developer's best approximation of how code will function when running in production. Furthermore, identifying test cases and implementing the code for the tests can take significant time.

In contrast, testing of an updated microservice under test in the production environment can reduce time invested in writing synthetic test code. For example, canarying directs some production requests to an updated microservice under test. Canarying has the advantage of making use of real user input for testing, however, such production environment testing is not without risk as it may expose both users and production resources (e.g., a production database) to potential adverse effects of errors contained in the microservice under test.

Embodiments described herein seek to preserve the advantages of in production testing, but without the potential adverse effects by isolating the production environment from the microservice under test. As described in further detail below, in one embodiment, loading a Domain-Specific Language (DSL) program within a user space kernel of the host operating system that wraps a container running the microservice under test enables testing using production requests while allowing complete isolation of the microservice under test from other resources of the production environment. In this manner, testing results are deterministic and reproducible and there is no requirement to modify the microservice code to accommodate testing.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

As used herein, a "Domain-Specific Language" or "DSL" generally refers to a computer language that is tailored for use in connection with a particular application domain as opposed to general-purpose languages or general programming languages (e.g., C, C++, Perl, Java, PHP, Python), which are broadly applicable across domains. Non-limiting examples of DSLs include Structured Query Language (SQL), Hypertext Markup Language (HTML), Cascading Style Sheets (CSS), Very High Speed Integrated Circuit Hardware Description Language (VHSIC-HDL) or (VHDL) and Chef InSpec (a DLS created for running compliance tests). In the context of this disclosure, the DSL would be a DSL specific to testing microservices. For example, a new DSL for performing regression testing of microservices may allow, for example, verifying that a first microservice calls a second microservice with a particular HTTP payload; or, for example, interacts with a database with a particular SQL payload. In many some scenarios, the DSL for performing regression testing may be automatically machine generated at record time; however, the developer may be provided with some ability to customize the behavior of the DSL (e.g., to perform testing that goes beyond regression testing).

Figure 1:
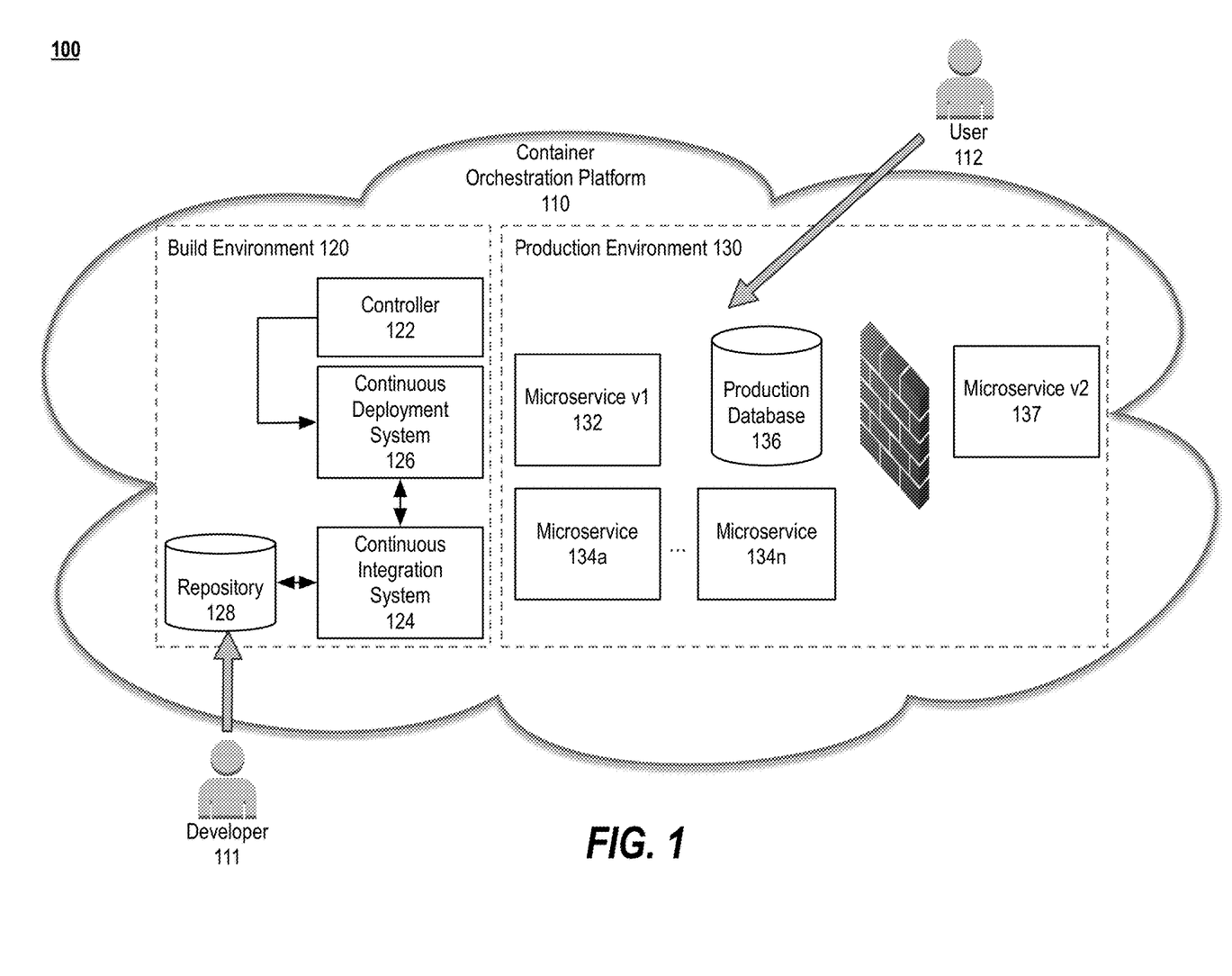
FIG. 1 is a block diagram conceptually illustrating a regression testing system in accordance with an example embodiment.

FIG. 1 is a block diagram conceptually illustrating a regression testing system 100 in accordance with an example embodiment. The regression testing system 100 may be implemented within a container orchestration platform 110 (e.g., Amazon EKS, GKE, or AKS). In the context of the present example, the container orchestration platform 110 includes a build environment 120 and a production environment 130. A build environment is an environment with which software developers (e.g., developer 111) interact and typically includes tools or resources to augment and/or automate activities associated with the software development cycle, whereas a production environment (or a deployment environment) is the environment with which end users (e.g., user 112) interact.

In the context of the present example, the build environment 120 includes a controller 122, a continuous deployment (CD) system 126, a continuous integration (CI) system 124, and a repository 128. A source code control system (not shown) may maintain and track various versions of source code for an application in the repository 128. The CI system 124 may be responsible for (i) triggering an automated regression testing process responsive to new code for a microservice being stored within the repository 128 and (ii) merging or integrating successfully tested updates to microservices of an application into a current production version of the application. The CD system 126 may be responsible for automatically deploying application builds identified by the CI system 124 to the production environment 130.

According to one embodiment, the controller 222 may be a service deployed by the container orchestration platform that is responsible for controlling and automating various tasks within the build environment 220 and the production environment 230. For example, the controller 222 may be responsible for initiating and evaluating regression testing as described further below with reference to FIGS. 2A-C.

In the context of the present example the production environment 130 includes various resources in the form of multiple microservices and a production database 136 that collectively represent an application that may be used by the user 112. In this simplified example, the multiple microservices include a first version of a microservice v1 132, a second version of a microservice v2 137, and one or more other microservices 134a-n (e.g., peer microservices). In one embodiment, the first version of the microservice v1 132 represents a known working version of a microservice and the microservice v2 137 represents an upgrade to the microservice that is to be tested in the production environment 130 based on production interactions (e.g., real requests from the user 112), but is otherwise isolated from the other resources of the production environment 130 so as to preclude the microservice under test from negatively impacting the other resources and to make the testing of the microservice under test deterministic as explained further below.

Figure 2A:
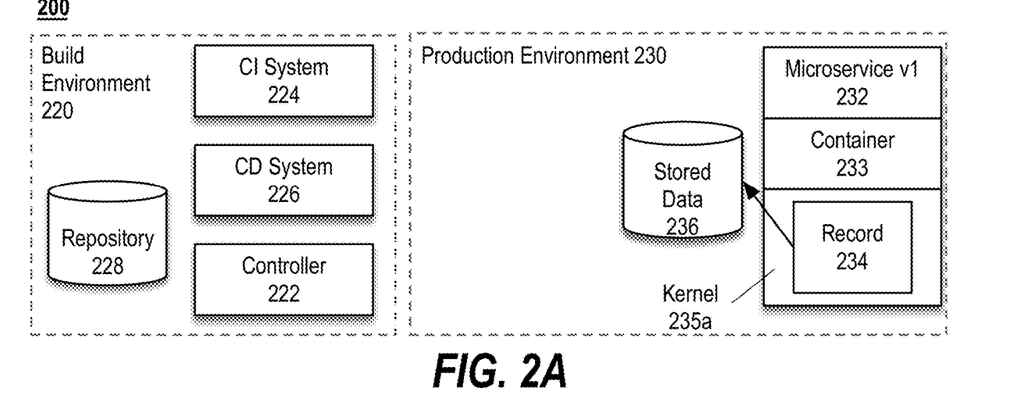
FIG. 2A is a simplified block diagram illustrating a first stage of a build pipeline that facilitates regression testing in accordance with an example embodiment.

FIG. 2A is a simplified block diagram illustrating a first stage of a build pipeline 200 that facilitates regression testing in accordance with an example embodiment. In one embodiment, the build pipeline 200 includes a build environment 220 and a production environment 230. In the context of the present example, the build environment 220 includes a CI system 224, a CD system 226, a controller 222 and a repository 228, which may generally correspond to the build environment 120, the CI system 124, the CD system 126, the controller 122 and the repository 128 of FIG. 1, respectively.

In the context of the present example, the production environment 230 includes a microservice v1 232, a container 233, a kernel 235a, and stored data 236. The microservice v1 232 may represent a known working version of a microservice running within a container 233 that itself executes within an execution environment provided by a host operating system (not shown), for example. In one embodiment, the kernel 235a is a programmable user space kernel that is logically interposed between the kernel of the host operating system and the container 233. For example, the kernel 235a may be an executable binary acting as a user space kernel, a virtual machine, a sandbox or some other mechanism that wraps the container 233 to allow the kernel 235a to intercept/program interactions between the container 233 and the host operating system. In the context of the present example, a record module 234 has been loaded and runs within the user space kernel.

In the context of the present example, during the first stage, the record module 234 is used to record production interactions with the microservice v1 232. For example, the record module 234 may intercept and record all production system call responses. Non-limiting examples of system calls that may be intercepted and recorded include those relating to the file system (e.g., file operations, directory operations, read/write operations, and monitoring of file events), the network (e.g., sending and/or receiving data through a network via sockets), time (e.g., current time of day, timers, etc.), process management and signals. The recorded state can be retrieved, collated, timestamped and stored by the controller 222 in stored data 236.

Figure 2B:
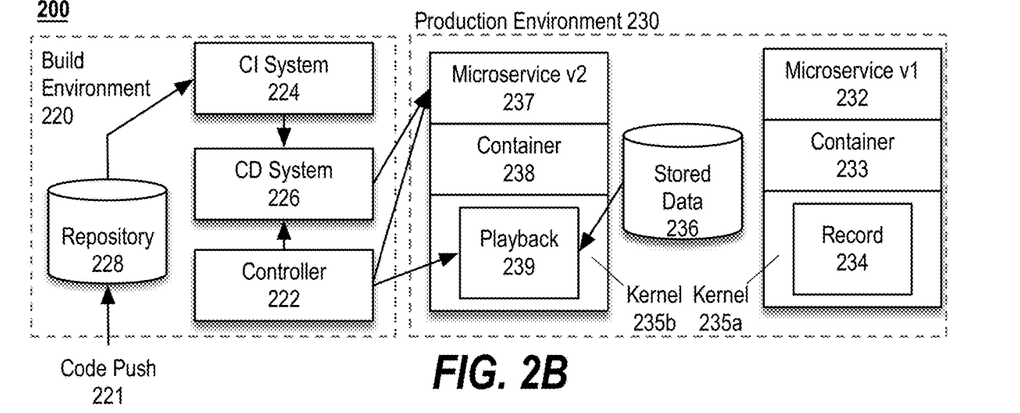
FIG. 2B is a simplified block diagram illustrating a second stage of the build pipeline of FIG. 2A in accordance with an example embodiment.

FIG. 2B is a simplified block diagram illustrating a second stage of the build pipeline 200 of FIG. 2A in accordance with an example embodiment. In one embodiment, responsive to a code push 221 (e.g., representing an updated version of an existing microservice) to the repository 228 (which may result in creation of a version control branch), the CI system 224 pulls the updated code from the repository 228 and automatically creates a build to be deployed into the production environment 230 for regression testing. In the context of the present example, it is assumed the code push 221 represents microservice v2 237 (an updated version of microservice v1 232). As such, the CD system 226 has deployed the microservice v2 237 within the production environment 230. Similar to microservice v1 232, microservice v2 237 executes within a container 233, which itself runs within the execution environment provided by the host operating system (not shown) in which a programmable user space kernel (e.g., kernel 235b) is implemented and in which a playback module 239 is loaded.

During the second stage of the build pipeline 200, the playback module 239 is operable to isolate the microservice v2 237 from other resources within the production environment 230 and to use the stored data 236 previously collected during the first phase to test the microservice v2 237. For example, the controller 222 may load the stored data 236 into the kernel 235b and one or more incoming requests handled by microservice v1 232 during the first stage may now be re-triggered on microservice v2 237 by the playback module 239 replaying the incoming requests from the stored data 236. In one embodiment, subsequent calls and network requests made by microservice v2 237 are also handled by the playback module 239 using the stored data 236. In this manner, testing of an updated microservice does not require real customer requests or outgoing calls to peer microservices.

In the context of the present example, microservice v2 237 may be completely isolated from other resources associated with the production environment 230. The playback module 239 may preclude microservice v2 237 from interacting with any part of the production environment 230. For example, any requests from microservice v2 237 that are directed to another resource (e.g., a peer microservice (e.g., microservice 134a-n) or a production database (e.g., production database 136) within the production environment 230 may be handled exclusively by the playback module 239 using the stored data 236. In one embodiment, any unexpected requests or responses observed by the playback module 239 that do not correspond to a request or response, respectively, in the stored data is indicative of a failure and a test failure can be triggered. For example, the playback module 239 may include a whitelist of expected requests (e.g., those observed at record time by the record module 234) that are allowed and any request that is not part of the whitelist is not handled by the playback module 239 and instead causes the playback module 239 to trigger a test failure.

The controller 222 may compare the responses and behavior of microservice v1 232 with the responses and behavior of microservice v2 237 to confirm that the updated code for microservice v2 237 handles the same input in the same manner as microservice v1 232. In this manner, the controller 222 may confirm that no backwards incompatible changes have been introduced by the new code for microservice v2 237 without causing real production errors like those that arise in connection with a canarying approach.

Depending upon the particular implementation, the controller 222 may perform checks for exact or similar output, for all or for a subset of calls. For example, when the output is expected to be identical from microservice v1 232 and microservice v2 237, a byte-by-byte comparison may be performed to identify a regression.

Figure 2C:
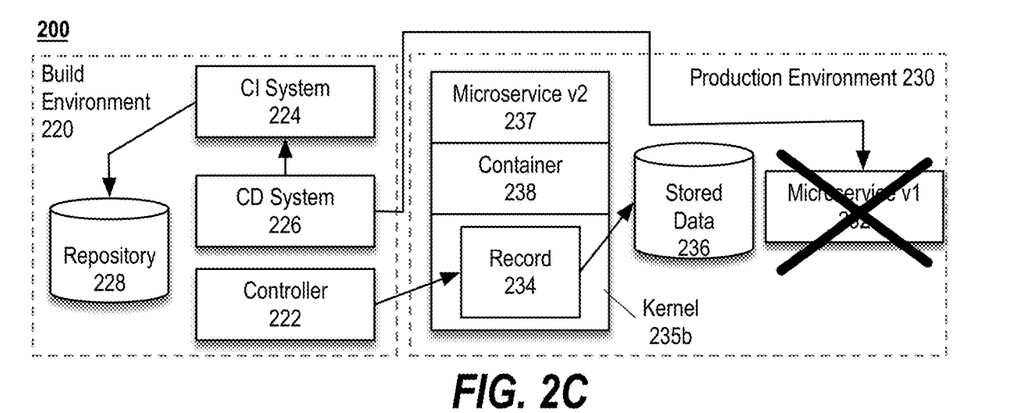
FIG. 2C is a simplified block diagram illustrating a third stage of the build pipeline of FIG. 2A in accordance with an example embodiment.

FIG. 2C is a simplified block diagram illustrating a third stage of the build pipeline 200 of FIG. 2A in accordance with an example embodiment. In the context of the present example, it is assumed microservice v2 237 has passed the regression testing and controller 222 has notified the CD system 226 of the test results. Responsive to successful completion of the regression testing, the CD system 226 may trigger an upgrade and cause the CI system 224 to merge the new code for microservice v2 237 from the previously created version control branch of the repository into the main branch of the repository 228. Additionally, subsequent production interactions may be directed to microservice v2 237 by the controller 222 replacing the playback module 239 with the record module 234 in kernel 235b, which will start recording production interactions with microservice v2 237 to facilitate future regression testing for a further update to the microservice. Finally, the CD system 226 may remove the instance of microservice v1 232.

According to one embodiment, the user space kernels 235a-b are programmable and therefore can be loaded with arbitrary DSL code with whatever behavior desired. This means testing is not limited to the record/replay regression testing described above. For example, in an alternative embodiment, kernel-level fault injection may be performed. The user space kernels 235a-b may also facilitate re-ordering of playback of network messages or other events to test implicit code assumptions. As indicated above, checks can be performed for exact or similar output, for all or for a subset of calls.

While, for simplicity, in the present example, there is a one-to-one correspondence between microservices and containers, those skilled in the art appreciate a microservice may be represented as a set of co-operating containers including one or more containers.

The processing described below with reference to the flow diagram of FIG. 3 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, processing may be performed by one or more virtual or physical computer systems of various forms, such as the computer system described with reference to FIG. 4 below.

While for sake of brevity, certain actions may be described with reference to the flow diagram of FIG. 3 as taking place in a particular order and in series, those skilled in the art will appreciate some of these actions may be performed in an alternative order than presented and/or in parallel with one or more other actions. As such, the particular order in which the blocks of the respective flow diagrams are depicted is not intended to be limiting.

Figure 3:
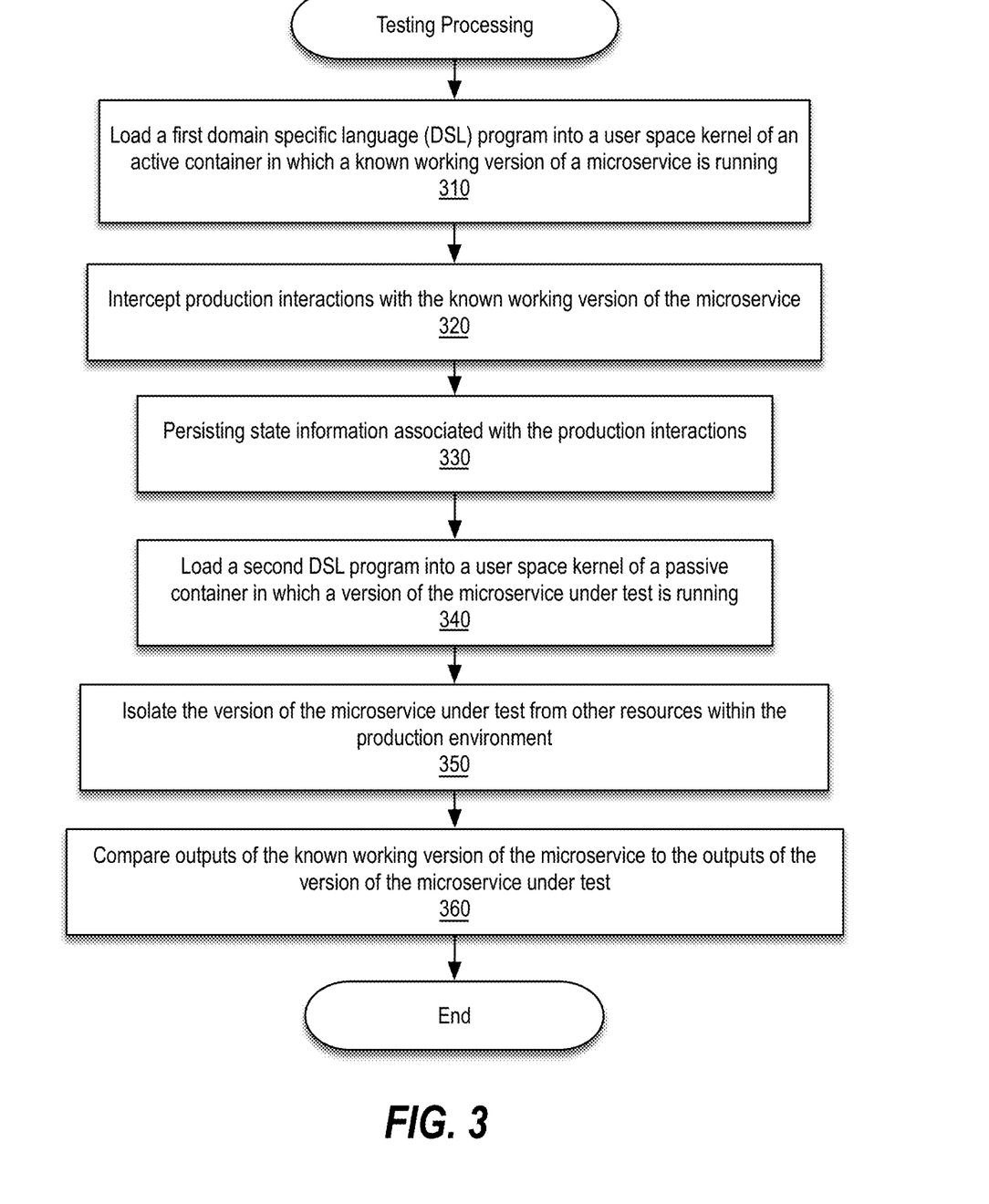
FIG. 3 is a flow diagram illustrating testing processing in accordance with an example embodiment.

FIG. 3 is a flow diagram illustrating testing processing in accordance with an example embodiment. According to one embodiment, the testing processing is performed by a controller (e.g., controller 122 or controller 222) of a build environment (e.g., build environment 120 or 220) and a record module (e.g., record module 234) running within a user space kernel (e.g., kernel 235b). At block 310, a first DSL program is loaded into a user space kernel that wraps an active container in which a known working version of a microservice is running. For example, the controller may load a record module (e.g., record module 234) into kernel 235a of container 233 in which microservice v1 232 is running. In the context of the present example, the first DSL program should be implemented in a DLS specific to testing microservices.

At block 320, production interactions with the known working version of the microservice are intercepted. According to one embodiment, real requests from one or more users (e.g., user 112) and resulting interactions (e.g., system calls) between the container hosting the known working version of the microservice and the host operating system are intercepted.

At block 330, state information associated with the production interactions are persisted. For example, the controller may retrieve, collate, timestamp and store information associated with the production interactions recorded by the record module in a data store (e.g., stored data 236) to facilitate subsequent regression testing of a microservice under test.

At block 340, a second DSL program is loaded into a user space kernel that wraps a passive container in which a version of the microservice under test is running. For example, the controller may load a playback module (e.g., playback module 239) into kernel 235b of container 238 in which microservice v2 237 is running. As above, in the context of the present example, the second DSL program should be implemented in a DLS specific to testing microservices.

At block 350, the version of the microservice under test is isolated from other resources within the production environment. According to one embodiment, the microservice under test is completely isolated from other resources associated with the production environment by the playback module. For example, any requests from the microservice under test that are directed to another resource (e.g., a peer microservice (e.g., microservice 134a-n) or a production database (e.g., production database 136) within the production environment may be intercepted by the playback module and handled exclusively by the playback module using the data previously recorded to the data store in block 330. Furthermore, any unexpected requests or responses observed by the playback module that do not correspond to a request or response, respectively, in the data store may be blocked and treated as a failure of the regression testing. In this manner, the microservice under test can be tested in the production environment without causing real production errors (e.g., without introducing errors into or otherwise corrupting the production database).

At block 360, outputs of the known working version of the microservice are compared to the outputs of the version of the microservice under test. According to one embodiment, the controller compares the responses and behavior of the known working version of the microservice to the outputs of the version of the microservice under test for the same input to confirm that no backwards incompatible changes have been introduced by the new code representing the microservice under test. In one embodiment, when the output is expected to be identical from the known working version of the microservice and the version of the microservice under test, a byte-by-byte comparison between their corresponding responses may be performed to identify a regression.

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 4:
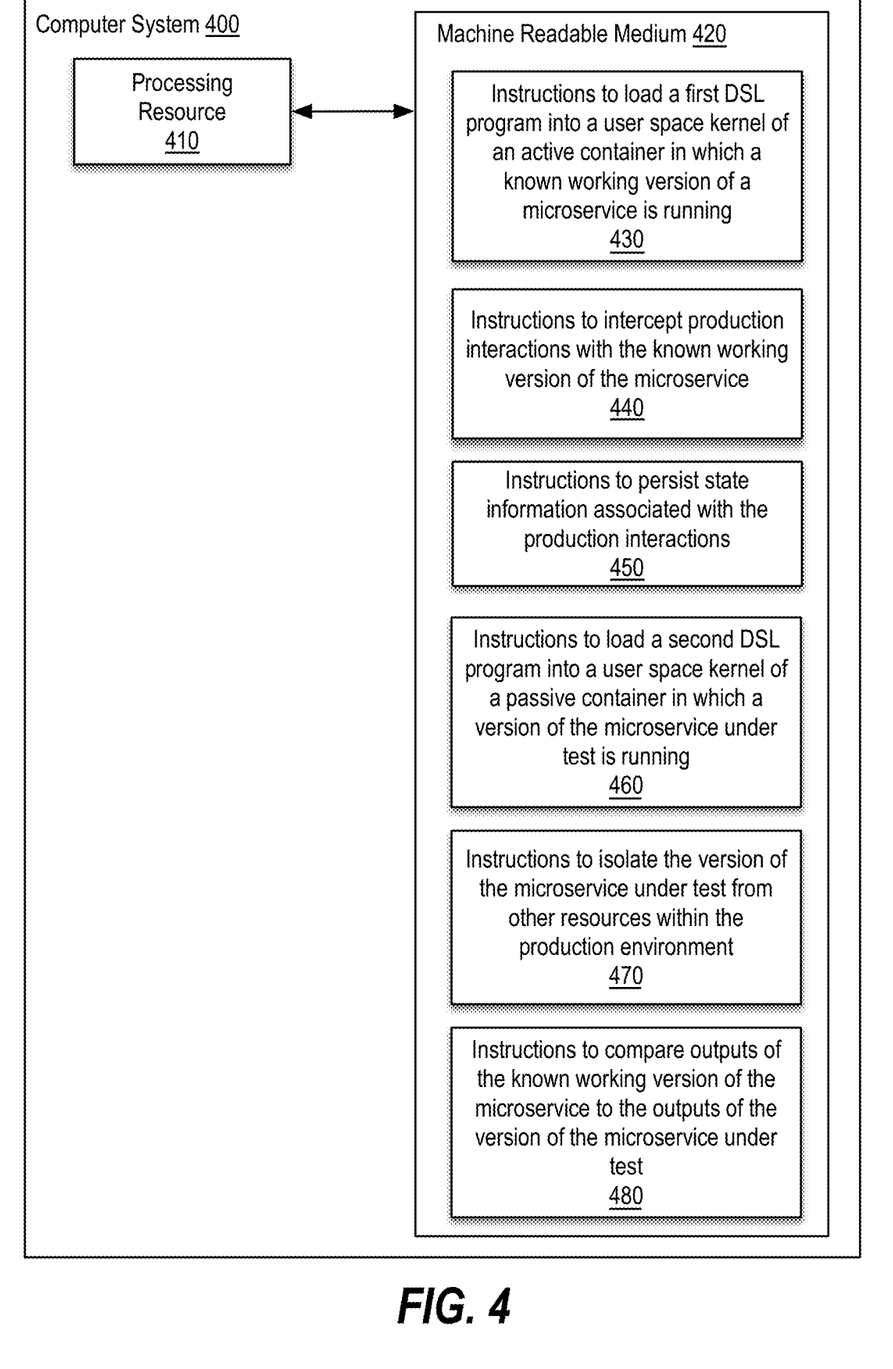
FIG. 4 is a block diagram of a computer system in accordance with an embodiment.

FIG. 4 is a block diagram of a computer system in accordance with an embodiment. In the example illustrated by FIG. 4, computer system 400 includes a processing resource 410 coupled to a non-transitory, machine readable medium 420 encoded with instructions to perform a proactive auto-scaling method in accordance with a private cloud embodiment. The processing resource 410 may include a microcontroller, a microprocessor, central processing unit core(s), an ASIC, an FPGA, and/or other hardware device suitable for retrieval and/or execution of instructions from the machine readable medium 420 to perform the functions related to various examples described herein. Additionally or alternatively, the processing resource 410 may include electronic circuitry for performing the functionality of the instructions described herein.

The machine readable medium 420 may be any medium suitable for storing executable instructions. Non-limiting examples of machine readable medium 420 include RAM, ROM, EEPROM, flash memory, a hard disk drive, an optical disc, or the like. The machine readable medium 420 may be disposed within the computer system 400, as shown in FIG. 4, in which case the executable instructions may be deemed "installed" or "embedded" on the computer system 400. Alternatively, the machine readable medium 420 may be a portable (e.g., external) storage medium, and may be part of an "installation package." The instructions stored on the machine readable medium 420 may be useful for implementing at least part of the methods described herein.

In the context of the present example, the machine readable medium 420 is encoded with a set of executable instructions 430-480. It should be understood that part or all of the executable instructions and/or electronic circuits included within one block may, in alternate implementations, be included in a different block shown in the figures or in a different block not shown.

Instructions 430, upon execution, cause the processing resource 410 to load a first DSL program into a user space kernel that wraps an active container in which a known working version of a microservice is running. In one embodiment, instructions 430 may correspond generally to instructions for performing block 310 of FIG. 3.

Instructions 440, upon execution, cause the processing resource 410 to intercept production interactions with the known working version of the microservice. In one embodiment, instructions 440 may correspond generally to instructions for performing block 320 of FIG. 3.

Instructions 450, upon execution, cause the processing resource 410 to persist state information associated with the production interactions. In one embodiment, instructions 450 may correspond generally to instructions for performing the block 330 of FIG. 3.

Instructions 460, upon execution, cause the processing resource 410 to load a second DSL program into a user space kernel that wraps a passive container in which a version of the microservice under test is running. In one embodiment, instructions 460 may correspond generally to instructions for performing block 340 of FIG. 3.

Instructions 470, upon execution, cause the processing resource 410 to isolate the version of the microservice under test from other resources within the production environment. In one embodiment, instructions 470 may correspond generally to instructions for performing block 350 of FIG. 3.

Instructions 480, upon execution, cause the processing resource 410 to compare outputs of the known working version of the microservice to the outputs of the version of the microservice under test. In one embodiment, instructions 480 may correspond generally to instructions for performing block 360 of FIG. 3.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A computer-implemented method of testing an upgrade to a microservice in a production environment of a container orchestration system, the method comprising:

loading, by a controller of the container orchestration system, a first domain specific language (DSL) program into a user space kernel that wraps an active container of the production environment within which a first version of the microservice is running, wherein the first version of the microservice represents a known working version of the microservice;

intercepting, by the first DSL program, production interactions with the first version of the microservice;

persisting, by the first DSL program, state information associated with the production interactions;

loading, by the controller, a second DSL program into a user space kernel that wraps a passive container of the production environment within which a second version of the microservice is running, wherein the second version of the microservice represents the upgrade to the microservice;

isolating the second version of the microservice from other resources within the production environment by using the persisted state information as a source of data for all requests issued by the second version of the microservice; and comparing, by the controller, outputs of the second version of the microservice to outputs of the first version of the microservice by replaying the production interactions to the second version of the microservice.

2. The method of claim 1, wherein said persisting, by the first DSL program, state information associated with the production interactions includes recording production system call responses to system calls made by the first version of the microservice.

3. The method of claim 1, wherein said isolating the second version of the microservice includes loading, by the controller, the persisted state information into the user space kernel that wraps the passive container.

4. The method of claim 1, wherein said isolating the second version of the microservice includes precluding, by the second DSL program, unexpected requests attempted to be issued by the second version of the microservice to the production environment from being handled by the production environment.

5. The method of claim 1, wherein said comparing, by the controller, outputs of the second version of the microservice to outputs of the first version of the microservice includes performing an exact byte-for-byte comparison of the outputs of the second version of the microservice to the outputs of the first version of the microservice.

6. The method of claim 1, wherein first DSL program makes the testing deterministic by accounting for transient kernel state of a host operating system.

7. The method of claim 6, wherein the transient kernel state represents a difference in time between the production interactions and said replaying the production interactions.

8. A non-transitory machine readable medium storing instructions executable by a processing resource of a computer system, the non-transitory machine readable medium comprising instructions to:

load a first domain specific language (DSL) program into a user space kernel that wraps an active container of a production environment of a container orchestration system within which a first version of the microservice is running, wherein the first version of the microservice represents a known working version of the microservice;

intercept production interactions with the first version of the microservice;

persist state information associated with the production interactions;

load a second DSL program into a user space kernel that wraps a passive container of the production environment within which a second version of the microservice is running, wherein the second version of the microservice represents the upgrade to the microservice;

isolate the second version of the microservice from other resources within the production environment by using the persisted state information as a source of data for all requests issued by the second version of the microservice; and compare outputs of the second version of the microservice to outputs of the first version of the microservice by replaying the production interactions to the second version of the microservice.

9. The non-transitory machine readable medium of claim 8, wherein the state information associated with the production interactions is persisted by recording production system call responses to system calls made by the first version of the microservice.

10. The non-transitory machine readable medium of claim 8, wherein the second version of the microservice is isolated from the other resources within the production environment by precluding unexpected requests attempted to be issued by the second version of the microservice to the production environment from being handled by the production environment.

11. The non-transitory machine readable medium of claim 8, wherein the outputs of the second version of the microservice and the first version of the microservice are compared by performing an exact byte-for-byte comparison of the outputs of the second version of the microservice to the outputs of the first version of the microservice.

12. The non-transitory machine readable medium of claim 8, wherein first DSL program makes the testing deterministic by accounting for transient kernel state of a host operating system.

13. The non-transitory machine readable medium of claim 12, wherein the transient kernel state represents a difference in time between the production interactions and said replaying the production interactions.

14. A system comprising:
a processing resource; and
a non-transitory computer-readable medium, coupled to the processing resource, having stored therein instructions that when executed by the processing resource cause the processing resource to:
load a first domain specific language (DSL) program into a user space kernel that wraps an active container of a production environment of a container orchestration system within which a first version of the microservice is running, wherein the first version of the microservice represents a known working version of the microservice;
intercept production interactions with the first version of the microservice;
persist state information associated with the production interactions;
load a second DSL program into a user space kernel that wraps a passive container of the production environment within which a second version of the microservice is running, wherein the second version of the microservice represents the upgrade to the microservice;
isolate the second version of the microservice from other resources within the production environment by using the persisted state information as a source of data for all requests issued by the second version of the microservice; and
compare outputs of the second version of the microservice to outputs of the first version of the microservice by replaying the production interactions to the second version of the microservice.

15. The system of claim 14, wherein the instructions further cause the processing resource to load the persisted state information into the user space kernel that wraps the passive container.

16. The system of claim 14, wherein the state information associated with the production interactions is persisted by recording production system call responses to system calls made by the first version of the microservice.

17. The system of claim 14, wherein the second version of the microservice is isolated from the other resources within the production environment by precluding unexpected requests attempted to be issued by the second version of the microservice to the production environment from being handled by the production environment.

18. The system of claim 14, wherein the outputs of the second version of the microservice and the first version of the microservice are compared by performing an exact byte-for-byte comparison of the outputs of the second version of the microservice to the outputs of the first version of the microservice.

19. The system of claim 14, wherein first DSL program makes the testing deterministic by accounting for transient kernel state of a host operating system.

20. The system of claim 19, wherein the transient kernel state represents a difference in time between the production interactions and said replaying the production interactions.

* * * * *